United States Patent
Shimizu et al.

(10) Patent No.: US 11,752,869 B2
(45) Date of Patent: Sep. 12, 2023

(54) OUTSIDE INFORMATION DISPLAY CONTROL DEVICE, OUTSIDE INFORMATION DISPLAY CONTROL METHOD, AND PROGRAM

(71) Applicant: TOYOTA JIDOSHA KABUSHIKI KAISHA, Aichi-ken (JP)

(72) Inventors: Tatsuya Shimizu, Okazaki (JP); Hideyuki Sakurai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 169 days.

(21) Appl. No.: 17/482,459

(22) Filed: Sep. 23, 2021

(65) Prior Publication Data
US 2022/0134879 A1    May 5, 2022

(30) Foreign Application Priority Data
Nov. 4, 2020  (JP) .................................. 2020-184509

(51) Int. Cl.
| | |
|---|---|
| *B60W 40/08* | (2012.01) |
| *B60K 35/00* | (2006.01) |
| *B60W 60/00* | (2020.01) |
| *B60N 2/00* | (2006.01) |
| *B60N 2/02* | (2006.01) |

(52) U.S. Cl.
CPC .............. *B60K 35/00* (2013.01); *B60N 2/002* (2013.01); *B60N 2/0244* (2013.01); *B60W 40/08* (2013.01); *B60W 60/00139* (2020.02); *B60K 2370/195* (2019.05); *B60N 2002/0268* (2013.01); *B60W 2040/0881* (2013.01); *B60W 2540/225* (2020.02)

(58) Field of Classification Search
None
See application file for complete search history.

(56) References Cited

U.S. PATENT DOCUMENTS

| | | | | |
|---|---|---|---|---|
| 2016/0001781 | A1* | 1/2016 | Fung | G07C 9/37 701/36 |
| 2016/0342205 | A1* | 11/2016 | Shigeta | G06V 10/147 |
| 2017/0129405 | A1* | 5/2017 | Oba | B60R 1/12 |
| 2020/0018952 | A1* | 1/2020 | Lewis | G06T 7/246 |
| 2020/0139965 | A1* | 5/2020 | Hanna | G08G 1/165 |
| 2020/0150759 | A1* | 5/2020 | Zhang | G06F 3/017 |
| 2021/0046852 | A1 | 2/2021 | Ushiro | |
| 2022/0048387 | A1* | 2/2022 | Lee | B60K 35/00 |

(Continued)

FOREIGN PATENT DOCUMENTS

| | | |
|---|---|---|
| JP | 2005-332297 A | 12/2005 |
| JP | 2008-082814 A | 4/2008 |

(Continued)

*Primary Examiner* — James M McPherson
(74) *Attorney, Agent, or Firm* — HAUPTMAN HAM, LLP

(57) ABSTRACT

An outside information display control device limits operation of at least one of onboard devices including a wiper, an electronic mirror, and a defroster at the time of automated driving of a vehicle. An interest determining unit determines whether an occupant is interested in outside information. The limitation on operation of the onboard device is released when the interest determining unit determines that the occupant is interested in the outside information in a state in which the operation of the onboard device has been limited.

8 Claims, 7 Drawing Sheets

(56) References Cited

U.S. PATENT DOCUMENTS

2022/0274471 A1* 9/2022 Zedler .................... B60J 3/04
2023/0047479 A1* 2/2023 Remäng ............ B60W 60/0053

FOREIGN PATENT DOCUMENTS

| JP | 2017210019 A | 11/2017 |
| JP | 2019155991 A | 9/2019 |
| JP | 20201618 A | 1/2020 |
| WO | 2019/172011 A1 | 9/2019 |

* cited by examiner

OUTSIDE INFORMATION DISPLAY CONTROL DEVICE, OUTSIDE INFORMATION DISPLAY CONTROL METHOD, AND PROGRAM

CROSS-REFERENCE TO RELATED APPLICATION

This application claims priority to Japanese Patent Application No. 2020-184509 filed on Nov. 4, 2020, incorporated herein by reference in its entirety.

BACKGROUND

1. Technical Field

The disclosure relates to an outside information display control device, an outside information display control method, and a program.

2. Description of Related Art

Japanese Unexamined Patent Application Publication No. 2017-210019 (JP 2017-210019 A) discloses a wiper control unit that operates a wiper blade when priority is given to visibility and stops operation of the wiper blade when priority is given to comfort. Specifically, the wiper control unit disclosed in JP 2017-210019 A is configured to operate the wiper blade when it is determined that it is raining based on a result of detection from a rainfall sensor and a driving mode is a manual driving mode. The wiper control unit is configured to prohibit operation of the wiper blade when it is determined that it is raining based on the result of detection from the rainfall sensor and the driving mode is an automated driving mode.

SUMMARY

Inconvenience is curbed by stopping an onboard device such as a wiper described in JP 2017-210019 A at the time of automated driving. On the other hand, when an occupant wants to see outside of a vehicle at the time of automated driving under rainfall or the like, the wiper is stopped and thus the occupant has difficulty in seeing outside of the vehicle.

The disclosure provides an outside information display control device, an outside information display control method, and a program that can enhance visibility outside of a vehicle when an occupant is interested in the outside while securing comfort at the time of automated driving.

According to a first aspect of the disclosure, there is provided an outside information display control device including: an onboard device limiting unit configured to limit operation of at least one of onboard devices including a wiper, an electronic mirror, and a defroster at the time of automated driving of a vehicle; an interest determining unit configured to determine whether an occupant is interested in outside information based on at least one of a sight direction of the occupant and a predetermined operation performed by the occupant; and a limitation releasing unit configured to release the limitation on operation of the onboard device by the onboard device limiting unit when the interest determining unit determines that the occupant is interested in the outside information in a state in which the operation of the onboard device has been limited by the onboard device limiting unit.

In the outside information display control device according to the first aspect, the onboard device limiting unit limits the operation of at least one of onboard devices including the wiper, the electronic mirror, and the defroster at the time of automated driving of the vehicle. Accordingly, when an occupant is not interested in outside information at the time of automated driving of the vehicle, it is possible to curb inconvenience due to the operation of the onboard device.

Here, the interest determining unit determines whether the occupant is interested in the outside information based on at least one of a sight direction of the occupant and a predetermined operation performed by the occupant. The limitation releasing unit releases the limitation on operation of the onboard device by the onboard device limiting unit when the interest determining unit determines that the occupant is interested in the outside information in a state in which the operation of the onboard device has been limited by the onboard device limiting unit. Accordingly, for example, when the limitation releasing unit releases the limitation on operation of the wiper, the wiper operates to sweep away water attached to a windshield and a rear windshield at the time of rainfall. For example, when the limitation releasing unit releases the limitation on operation of the electronic mirror, an image captured by the electronic mirror is displayed on an inside monitor or the like. For example, when the limitation releasing unit releases the limitation on operation of the defroster, air is blown from an outlet of the defroster to the windshields and side windshields to remove fogging. "Limiting the operation of an onboard device" mentioned herein is not limited to a configuration for stopping the onboard device and is a concept widely including a configuration for reducing a frequency in which the onboard device operates.

In the outside information display control device according to a second aspect of the disclosure, the interest determining unit may be configured to determine that the occupant is interested in the outside information when a predetermined time has elapsed in a state in which the occupant's sight direction is outward.

With the outside information display control device according to the second aspect, it is possible to release the limitation on operation of the onboard device simply by maintaining a state in which the occupant looks outside of the vehicle. Accordingly, it is possible to ascertain the outside information without performing any particular operation.

The outside information display control device according to a third aspect of the disclosure may further include a seat direction control unit configured to turn a direction of a vehicular seat to the occupant's sight direction when the limitation on operation of the onboard device is released by the limitation releasing unit.

With the outside information display control device according to the third aspect, by causing the seat direction control unit to turn the vehicular seat to the sight direction, it is possible to enhance comfort when the occupant ascertains the outside information.

In the outside information display control device according to a fourth aspect, the interest determining unit may be configured to determine that the occupant is interested in the outside information when an operation of decreasing a reclining angle of a vehicular seat which is performed by the occupant is detected.

With the outside information display control device according to the fourth aspect, simply by turning a seat back of the vehicular seat in a direction in which the seat back is brought upright such that the occupant can ascertain the outside information, it is possible to release the limitation on operation of the onboard device.

The outside information display control device according to a fifth aspect of the disclosure may further include a reclining angle adjusting unit configured to decrease a reclining angle of a vehicular seat when the limitation on operation of the onboard device is released by the limitation releasing unit and the reclining angle is greater than a predetermined angle.

With the outside information display control device according to the fifth aspect, the seat back of the vehicular seat is brought upright by decreasing the reclining angle using the reclining angle adjusting unit. Accordingly, the occupant can easily look outside when the limitation on operation of the onboard device is released.

In the outside information display control device according to a sixth aspect, the onboard device limiting unit may be configured to stop operation of the wiper at the time of automated driving of the vehicle, and the limitation releasing unit may be configured to operate the wiper when the interest determining unit determines that the occupant is interested in the outside information in a state in which the operation of the wiper has been stopped by the onboard device limiting unit.

With the outside information display control device according to the sixth aspect, since the operation of the wiper is stopped by the onboard device limiting unit at the time of automated driving, it is possible to curb inconvenience due to the operation of the wiper even at the time of rainfall. When it is determined that the occupant is interested in the outside information, the wiper is operated by the limitation releasing unit and thus the occupant can look outside.

In the outside information display control device according to a seventh aspect, the onboard device limiting unit may be configured to stop display of an outside image which is captured by the electronic mirror at the time of automated driving of the vehicle, and the limitation releasing unit may be configured to display the outside image when the interest determining unit determines that the occupant is interested in the outside information in a state in which the display of the outside image has been stopped by the onboard device limiting unit.

With the outside information display control device according to the seventh aspect, since the display of the outside image is stopped by the onboard device limiting unit at the time of automated driving, the occupant does not need to pay attention to the outside image. Another image may be displayed using a display device that displays the outside image. On the other hand, when it is determined that the occupant is interested in the outside information, the occupant can look outside by the outside image being displayed.

The outside information display control device according to an eighth aspect of the disclosure may further include: a current position acquiring unit configured to acquire a current position of the vehicle on map data; and a specific position information acquiring unit configured to acquire a position at which conditions set by the occupant's operation are satisfied from the map data, and the interest determining unit may be configured to determine that the occupant is interested in the outside information when the current position of the vehicle acquired by the current position acquiring unit approaches the position acquired by the specific position information acquiring unit.

With the outside information display control device according to the eighth aspect, simply by setting conditions in advance based on a favorite position, a position of interest, and the like of the occupant, the limitation on operation of the onboard device can be released when a position satisfying the conditions is approached. "Position satisfying the conditions" mentioned herein is not limited to one position on position data. For example, when the conditions are restaurants, all positions registered as restaurants on the map data are the positions satisfying the conditions. "Conditions set by an occupant's operation" are not limited to a configuration in which the conditions are set by the occupant operating a navigation system or the like and are a concept widely including conditions which are set in advance in a mobile terminal such as a smartphone.

According to a ninth aspect of the disclosure, there is provided an outside information display control method including: limiting operation of at least one of onboard devices including a wiper, an electronic mirror, and a defroster at the time of automated driving of a vehicle; determining whether an occupant is interested in outside information based on at least one of a sight direction of the occupant and a predetermined operation performed by the occupant; and releasing the limitation on operation of the onboard device when it is determined that the occupant is interested in the outside information in a state in which the operation of the onboard device has been limited.

According to a tenth aspect of the disclosure, there is provided a program causing a computer to perform a process, the process including: limiting operation of at least one of onboard devices including a wiper, an electronic mirror, and a defroster at the time of automated driving of a vehicle; determining whether an occupant is interested in outside information based on at least one of a sight direction of the occupant and a predetermined operation performed by the occupant; and releasing the limitation on operation of the onboard device when it is determined that the occupant is interested in the outside information in a state in which the operation of the onboard device has been limited.

As described above, with the outside information display control device, the outside information display control method, and the program according to the disclosure, it is possible to enhance visibility outside of a vehicle when an occupant is interested in the outside while curbing inconvenience at the time of automated driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
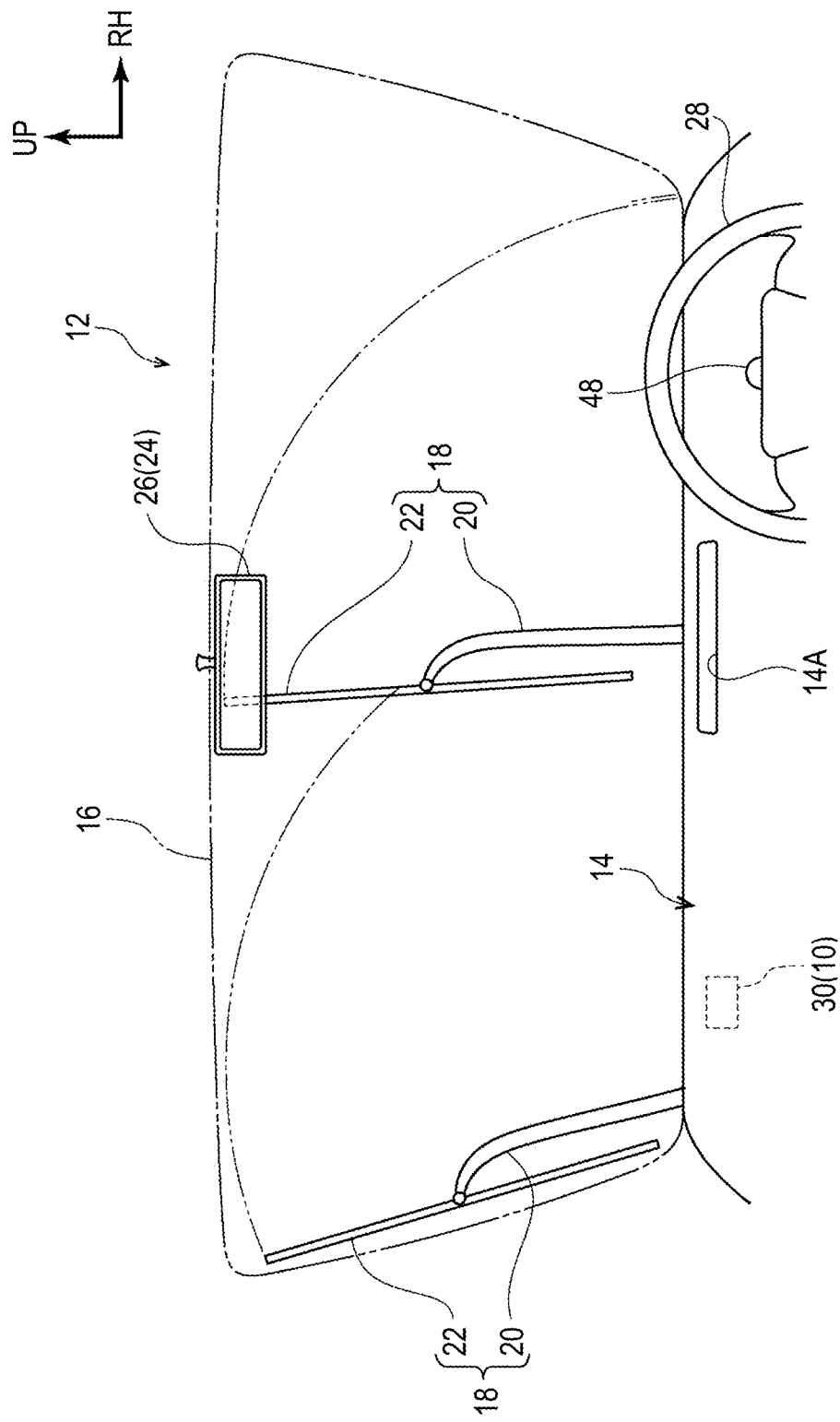
FIG. 1 is a diagram schematically illustrating a cabin front part of a vehicle to which an outside information display control device according to a first embodiment is applied when viewed from a rear side of the vehicle.

An outside information display control device 10 according to a first embodiment will be described below with reference to the accompanying drawings. An arrow UP and an arrow RH which are appropriately illustrated in the drawings indicate upward in a vehicle height direction and rightward in a vehicle width direction, respectively. In the following description, forward and rearward, up and down, and right and left are defined as forward and rearward in a longitudinal direction, upward and downward in a vertical direction, and rightward and leftward in a lateral direction in a vehicle to which the outside information display control device 10 is applied unless otherwise mentioned.

As illustrated in FIG. 1, an instrument panel 14 is provided in a cabin front part of a vehicle 12 to which the outside information display control device 10 according to this embodiment (hereinafter simply referred to as a "display control device 10") is applied.

The instrument panel 14 extends in the vehicle width direction, and a defroster air outlet 14A is formed at the central part in the vehicle width direction of the instrument panel 14. The defroster air outlet 14A is an opening to which a tip of a defroster nozzle (not illustrated) in which air of which a temperature has been adjusted by an air conditioner 46 (see FIG. 2) flows is connected. Accordingly, it is possible to remove fogging of a windshield 16 by blowing air from the defroster air outlet 14A to the windshield 16. A defroster which is an example of an onboard device is constituted by the defroster air outlet 14A, the defroster nozzle, and the air conditioner 46.

A lower end of the windshield 16 is supported on a front end of the instrument panel 14. The windshield 16 extends in the vehicle height direction and the vehicle width direction and partitions the inside and the outside of the vehicle.

A wiper 18 that is an example of an onboard device for wiping the windshield 16 is provided outside the windshield 16. A pair of wipers 18 may be included provided on right and left sides, and each of the pair includes a wiper arm 20 and a wiper blade 22 that is connected to a tip of the wiper arm 20.

The right wiper blade 22 mainly wipes a right area of the windshield 16, and the left wiper blade 22 mainly wipes a left area of the windshield 16. The right and left wiper arms 20 are connected to each other via a link mechanism which is not illustrated, and the wiper blades 22 move along the windshield 16 by driving a wiper motor 42 (see FIG. 2).

A display device 26 constituting an electronic mirror 24 that is an example of the onboard device is provided on the rear side of the upper part of the windshield 16. The electronic mirror 24 includes a rearview camera (not illustrated) that images a rear side view of the vehicle 12 and right and left rearview cameras (not illustrated) that image a right rear view and a left rearview of the vehicle 12. Images which are captured by the rearview camera and the right and left rearview cameras are displayed on the display device 26. The rearview camera and the right and left rearview cameras constitute a part of a surrounding information sensor group 54 (see FIG. 2) that detects surrounding information of the vehicle 12.

A steering wheel 28 is provided on the right side of the instrument panel 14 of the vehicle, and a sight sensor 48 that detects a driver's sight direction is provided in the steering wheel 28. A driver's biometric information may be detected by imaging the driver's face as a whole using the sight sensor 48. The sight sensor 48 may be provided in the instrument panel 14, the display device 26, or the like.

Here, an electronic control unit (ECU) 30 constituting the display control device 10 is provided on the front side of the instrument panel 14.

Hardware Configuration of Display Control Device 10

Figure 2:
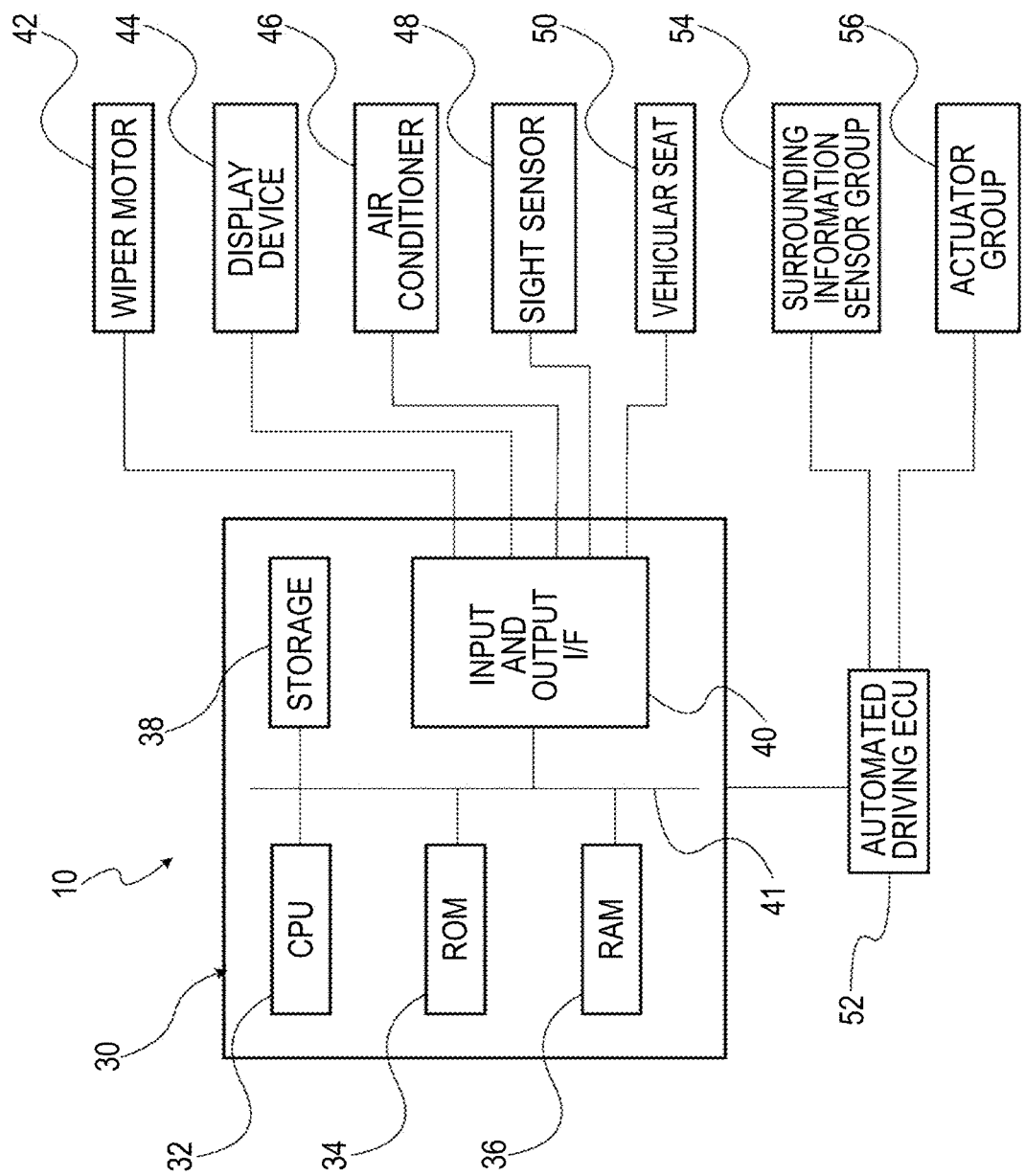
FIG. 2 is a block diagram illustrating a hardware configuration of the outside information display control device according to the first embodiment.

FIG. 2 is a block diagram illustrating a hardware configuration of the display control device 10. As illustrated in FIG. 2, the ECU 30 constituting the display control device 10 includes a central processing unit (CPU: processor) 32, a read only memory (ROM) 34, a random access memory (RAM) 36, a storage 38, and an input and output interface 40. These elements are communicatively connected to each other via a bus 41.

The CPU 32 is a central processing unit and executes various programs or controls various constituent units. That is, the CPU 32 reads a program from the ROM 34 or the storage 38 and executes the program using the RAM 36 as a work area. The CPU 32 performs control of the constituent units and various arithmetic operations in accordance with the program stored in the ROM 34 or the storage 38.

The ROM 34 stores various programs and various types of data. The RAM 36 serves as a work area and temporarily stores a program or data. The storage 38 is a non-transitory recording medium that is constituted by a hard disk drive (HDD) or a solid state drive (SSD) and stores various programs including an operating system and various types of data. In this embodiment, a program for performing a limitation process and a limitation releasing process and various types of data are stored in the ROM 34 or the storage 38.

The input and output interface 40 is electrically connected to the wiper motor 42, the display device 26, the air conditioner 46, the sight sensor 48, and a vehicular seat 50.

The wiper motor 42 is connected to the wiper arm 20 via a link mechanism as described above and is driven to cause the wiper arm 20 to reciprocate in accordance with a control signal input from the ECU 30. In this embodiment, the number of times (frequency) per unit time in which the wiper arm 20 is caused to reciprocate by the wiper motor 42 can be arbitrarily changed. That is, when there is a large amount of rainfall, the frequency in which the wiper arm 20 is caused to reciprocate can be increased to improve visibility. When there is a small amount of rainfall, the frequency in which the wiper arm 20 is caused to reciprocate can be decreased to improve comfort. A configuration in which the frequency in which the wiper arm 20 is caused to reciprocate is automatically changed by providing a rain sensor that detects an amount of rainfall or the like may be employed.

The display device 26 displays images which are captured by the rearview camera and the right and left rearview cameras. Specifically, images captured by the rearview camera and the right and left rearview cameras are respectively processed and then synthesized. A combined image is displayed on the display device 26. The display device 26 is configured to switch between an operating state and a non-operating state according to an occupant's operation or the like and is configured to select one of a state in which none is displayed on a screen and an optical mirror as the non-operating state.

The air conditioner 46 is a device that blows air with an adjusted temperature to the inside of the vehicle and includes a heating, ventilation, and air conditioning (HVAC) unit which is not illustrated. The air conditioner 46 is configured to be able to blow air with an adjusted temperature from a plurality of air outlets (not illustrated) which is provided in the inside of the vehicle based on a control signal from the ECU 30. By causing the air conditioner 46 to blow air with an adjusted temperature from the defroster air outlet 14A to the windshield 16 in accordance with an occupant's operation, it is possible to remove fogging of the windshield 16.

The sight sensor 48 detects an occupant's sight and transmits the result of detection to the ECU 30. The ECU 30 calculates a sight direction of the occupant based on the received signal from the sight sensor 48.

The vehicular seat 50 includes a plurality of motors which are not illustrated and the ECU 30 is electrically connected to the motors. The motors include, for example, a motor that is provided in a connection portion between a seat back and a seat cushion constituting the vehicular seat 50 and rotates the seat back with respect to the seat cushion. The motors may include a motor that changes a direction of the seat cushion with respect to a floor panel. The seat back can be rotated between an upright state and a reclined state by causing the motor to operate based on a control signal from the ECU 30. The direction of the vehicular seat 50 may be changed by causing the motor to operate based on a control signal from the ECU 30.

Here, the ECU 30 is electrically connected to an automated driving ECU 52. Similarly to the ECU 30, the automated driving ECU 52 includes a CPU, a ROM, a RAM, a storage, and an input and output interface which are not illustrated.

A surrounding information sensor group 54 that detects surrounding conditions of the vehicle 12 and an actuator group 56 that control travel of the vehicle 12 are connected to the automated driving ECU 52. The surrounding information sensor group 54 includes a plurality of sensors out of various sensors such as a camera, a radar, a clearance sound wave detector, a Light Detection and Ranging or Laser Imaging Detection and Ranging (LIDAR), and a global positioning system (GPS) sensor. The camera images the surroundings of the vehicle 12. The radar detects a distance and a direction to an object near the vehicle 12 using radio waves. The LIDAR detects a distance and a direction to an object near the vehicle 12 using a laser beam. The GPS sensor detects a current position of the vehicle 12.

The actuator group 56 includes an acceleration/deceleration actuator that adjusts acceleration/deceleration of the vehicle 12 and a steering actuator that drives a steering device of the vehicle 12. The automated driving ECU 52 performs automated driving of the vehicle 12 by controlling operations of the actuator group 56 based on the surrounding conditions of the vehicle detected by the surrounding information sensor group 54. A scheduled traveling route indicating a route along which the vehicle 12 is scheduled to travel is stored in a storage unit of the automated driving ECU 52, and the automated driving ECU 52 causes the vehicle to travel along the scheduled traveling route stored in the storage unit.

Functional Configuration of Display Control Device 10

The display control device 10 realizes various functions using the aforementioned hardware resources. The functional units which are realized by the display control device 10 will be described below with reference to FIG. 3.

Figure 3:
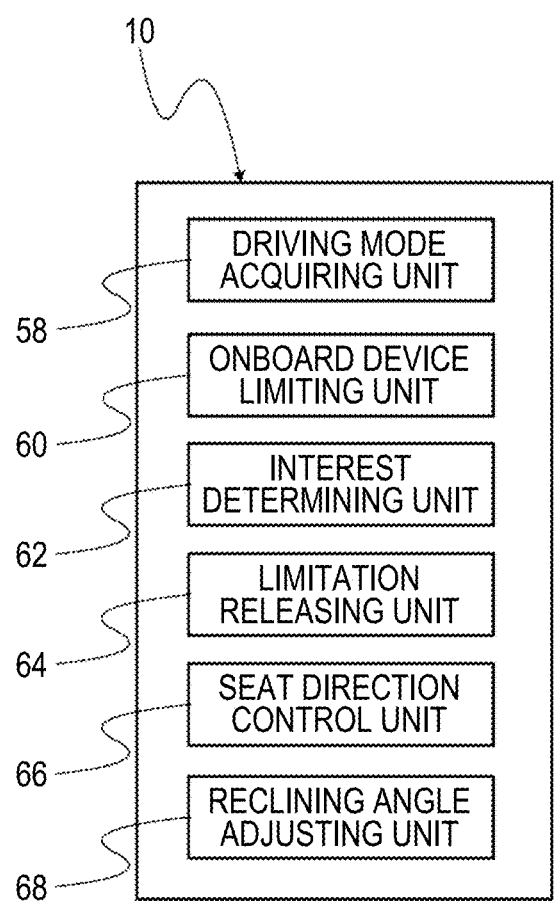
FIG. 3 is a block diagram illustrating a functional configuration of the outside information display control device according to the first embodiment.

As illustrated in FIG. 3, the display control device 10 includes a driving mode acquiring unit 58, an onboard device limiting unit 60, an interest determining unit 62, a limitation releasing unit 64, a seat direction control unit 66, and a reclining angle adjusting unit 68 as the functional units. The functional units are realized by causing the CPU 32 to read and execute a program stored in the ROM 34 or the storage 38.

The driving mode acquiring unit 58 acquires which of a manual driving mode and an automated driving mode a driving mode of the vehicle 12 is. Here, the manual driving mode in this embodiment is a driving mode in which the vehicle 12 travels through an occupant's driving operation. The automated driving mode in this embodiment is a driving mode in which the vehicle 12 travels under the control of the automated driving ECU 52 without requiring an occupant's driving operation.

The onboard device limiting unit 60 limits an operation of at least one of the onboard devices at the time of automated driving of the vehicle 12. In this embodiment, for example, when the driving mode acquired by the driving mode acquiring unit 58 is the automated driving mode, the onboard device limiting unit 60 limits the operation of at least one onboard device out of the wiper 18, the electronic mirror 24, and the defroster.

For example, in the automated driving mode, the operation of the wiper 18 is stopped by the onboard device limiting unit 60. That is, even under the rainy weather, the vehicle 12 travels by automated driving without operating the wiper 18. For example, in the automated driving mode, display of an outside image captured by the electronic mirror 24 is stopped by the onboard device limiting unit 60. That is, outside images captured by the rearview camera and the right and left rearview cameras constituting the electronic mirror 24 are not displayed on the display device 26. For example, in the automated driving mode, the defroster is stopped by the onboard device limiting unit 60. That is, air of which the temperature has been adjusted by the air conditioner 46 is not blown from the defroster air outlet 14A.

Here, the onboard device limiting unit 60 may limit the operation by decreasing the frequency in which the wiper arm 20 is caused to reciprocate instead of completely stopping the operation of the wiper 18. The onboard device limiting unit 60 may limit the operation by displaying only some images on the display device 26 of the electronic mirror 24.

The interest determining unit 62 determines whether an occupant is interested in outside information based on at least one of the occupant's sight direction and a predetermined operation performed by the occupant. The interest determining unit 62 in this embodiment determines whether an occupant is interested in outside information based on at least one of the occupant's sight direction and a predetermined operation of the vehicular seat 50 performed by the occupant.

Specifically, when it is detected that a predetermined time has elapsed in a state in which an occupant's sight is directed to the outside based on information from the sight sensor 48, the interest determining unit 62 determines that the occupant is interested in the outside information. The predetermined time is a period of time in which it can be ascertained that the occupant is interested in the outside and is, for example, several seconds. When an operation of decreasing the reclining angle of the vehicular seat 50 which is performed by an occupant is detected based on information from the reclining angle sensor provided in the vehicular seat 50, the interest determining unit 62 determines that the occupant is interested in the outside information. That is, when it is detected that the vehicular seat 50 is moved from the reclined state to the upright state by an occupant's operation, the interest determining unit 62 determines that the occupant is interested in the outside information.

When the interest determining unit 62 determines that the occupant is interested in the outside information in a state in which the operation of the onboard device is limited by the onboard device limiting unit 60, the limitation releasing unit 64 releases the limitation on operation of the onboard device by the onboard device limiting unit 60. For example, when the interest determining unit 62 determines that the occupant is interested in the outside information in a state in which the wiper 18 is stopped by the onboard device limiting unit 60, the limitation releasing unit 64 releases the stopped state of the wiper 18 and operates the wiper 18.

For example, when the interest determining unit 62 determines that the occupant is interested in the outside information in a state in which display of an outside image on the display device 26 is stopped by the onboard device limiting unit 60, the limitation releasing unit 64 restarts display of the outside image on the display device 26.

When the limitation on operation of the onboard device is released by the limitation releasing unit 64, the seat direction control unit 66 turns the direction of the vehicular seat 50 to the sight direction of the occupant. For example, when the sight direction of the occupant is directed to the front side in a state in which the driver's seat faces a passenger's seat (the left side of the vehicle) in the automated driving mode, the limitation on operation of the onboard device is released by the limitation releasing unit 64. At this time, the direction of the vehicular seat 50 is turned to the front side by the seat direction control unit 66.

When the limitation on operation of an onboard device is released by the limitation releasing unit 64 in a reclined state in which the reclining angle of the vehicular seat 50 is greater than a predetermined angle, the reclining angle adjusting unit 68 decreases the reclining angle. For example, when a sight direction of an occupant is directed to the front side of the vehicle in a state in which the occupant is in a reclined state in the automated driving mode, the vehicular seat 50 is changed to the upright state by the reclining angle adjusting unit 68.

Operation

Operations in this embodiment will be described below.

An example of a routine of a limitation process of limiting an operation of an onboard device will be described below with reference to the flowchart illustrated in FIG. 4. Thereafter, an example of a routine of a limitation releasing process of releasing the limitation on operation of the onboard device will be described with reference to the flowchart illustrated in FIG. 5. Here, an example in which the operation of the wiper 18 is limited and an example in which the limitation on operation of the wiper 18 is released will be described. The limitation process and the limitation releasing process are repeatedly performed at predetermined intervals by causing the CPU 32 to read a display program from the ROM 34 or the storage 38, to load the read display program to the RAM 36, and to execute the loaded display program.

Limitation Process

Figure 4:
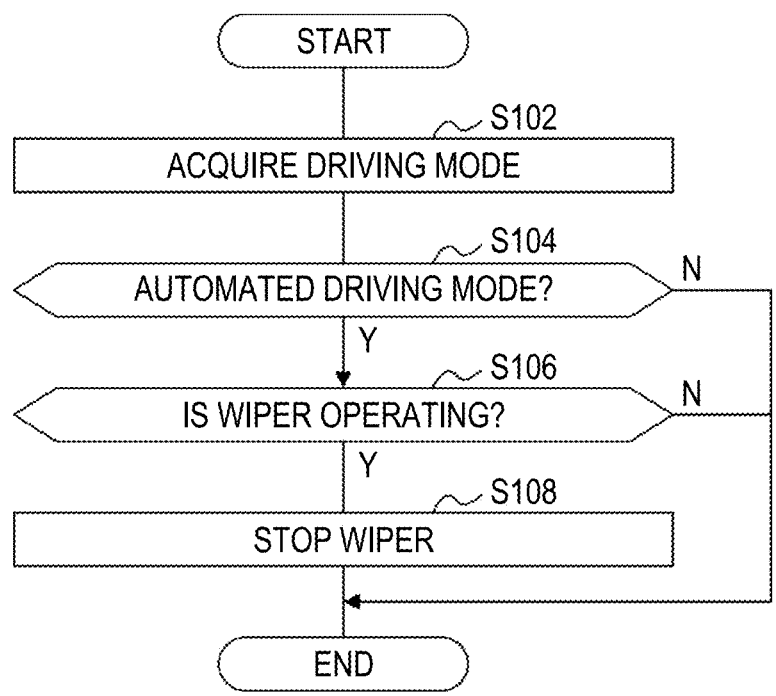
FIG. 4 is a flowchart illustrating an example of a routine of a limitation process according to the first embodiment.

As illustrated in FIG. 4, the CPU 32 acquires the driving mode in Step S102. Specifically, the CPU 32 acquires which of the manual driving mode and the automated driving mode the driving mode of the vehicle 12 is by the function of the driving mode acquiring unit 58.

In Step S104, the CPU 32 determines whether the driving mode of the vehicle 12 is the automated driving mode. When the driving mode acquired by the driving mode acquiring unit 58 is the automated driving mode, the CPU 32 determines that the driving mode is the automated driving mode. In this case, the determination result of Step S104 is positive and the routine proceeds to the process of Step S106. On the other hand, when the CPU 32 determines that the driving mode is the manual driving mode, the determination result of Step S104 is negative and the limitation process ends.

In Step S106, the CPU 32 determines whether the wiper 18 is operating. Specifically, when it is detected that the wiper motor 42 is operating based on a signal from the wiper motor 42, the CPU 32 determines that the wiper 18 is operating and causes the routine to proceed to the process of Step S108. On the other hand, when a signal indicating that the wiper motor 42 is operating is not acquired from the wiper motor 42, the CPU 32 determines that the wiper 18 is not operating. In this case, the determination result of Step S106 is negative and the limitation process ends.

The CPU 32 stops the wiper 18 in Step S108. That is, supply of electric power to the wiper motor 42 is stopped. At this time, supply of electric power is performed until the position of the wiper arm 20 returns to its initial position, and supply of electric power to the wiper motor 42 is stopped in a state in which the wiper arm 20 has returned to the initial position. Then, the limitation process ends.

The onboard devices other than the wiper 18 are also controlled in the same way as described above. For example, when the onboard device is the electronic mirror 24, it is determined whether the electronic mirror 24 is operating in Step S106 of the limitation process illustrated in FIG. 4. In Step S108, the operation of the electronic mirror 24 is stopped. That is, display of an outside image displayed on the display device 26 is stopped.

Limitation Releasing Process

Figure 5:
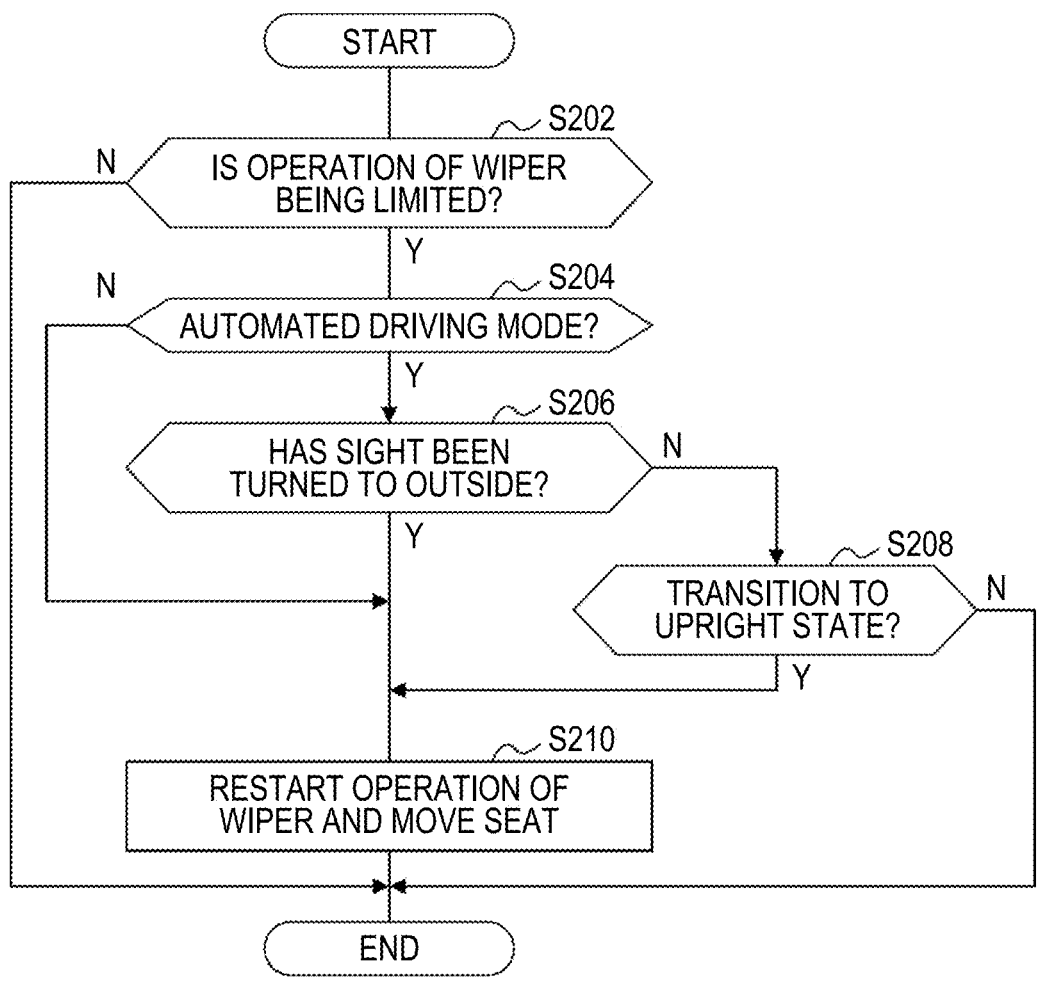
FIG. 5 is a flowchart illustrating an example of a routine of a limitation releasing process according to the first embodiment.

An example of a routine of the limitation releasing process will be described below with reference to FIG. 5. As illustrated in FIG. 5, the CPU 32 determines whether the operation of the wiper 18 is being limited in Step S202. Specifically, when the wiper 18 is stopped by the limitation process, the CPU 32 determines that the wiper 18 is being limited. In this case, the determination result of Step S202 is positive and the routine proceeds to the process of Step S204. On the other hand, in a state in which the limitation process is not performed, the CPU 32 determines that the wiper 18 is not being limited. In this case, the determination result of Step S202 is negative and the limitation releasing process ends.

The CPU 32 determines whether the driving mode of the vehicle 12 is the automated driving mode in Step S204. When the driving mode acquired by the driving mode acquiring unit 58 is the automated driving mode, the CPU 32 determines that the driving mode is the automated driving mode. In this case, the determination result of Step S204 is positive and the routine proceeds to the process of Step S206. On the other hand, when the driving mode acquired by the driving mode acquiring unit 58 is the manual driving mode, the determination result of Step S204 is negative and the CPU 32 performs the process of Step S210.

The CPU 32 determines whether the sight of an occupant is directed to the outside in Step S206. Specifically, when it is detected by the function of the interest determining unit 62 that a predetermined time has elapsed in a state in which the sight of the occupant is directed to the outside based on information from the sight sensor 48, the CPU 32 determines that the sight of the occupant is directed to the outside. In this case, the determination result of Step S206 is positive and the routine proceeds to the process of Step S210.

On the other hand, in Step S206, when it is determined that the sight of the occupant is directed to the inside and when it is determined that the sight of the occupant is directed to the outside for a time shorter than the predetermined time, the CPU 32 determines that the sight of the occupant is not directed to the outside based on information from the sight sensor 48. In this case, the determination result of Step S206 is negative and the routine proceeds to the process of Step S208.

The CPU 32 determines whether the vehicular seat 50 is switched from the reclined state to the upright state in Step S208. Specifically, when it is determined by the function of the interest determining unit 62 that the reclining angle of the vehicular seat 50 decreases from a state in which the reclining angle is greater than a preset threshold value, the CPU 32 determines that it is switched to the upright state. In this case, the determination result of Step S208 is positive and the routine proceeds to the process of Step S210. On the other hand, when the reclining angle of the vehicular seat 50 is not less than the preset threshold value, the CPU 32 determines that the vehicular seat 50 is not switched to the upright state. In this case, the determination result of Step S208 is negative and the limitation releasing process ends.

When the determination result of Step S204 is negative, when the determination result of Step S206 is positive, and when the determination result of Step S208 is positive, the CPU 32 restarts the operation of the wiper 18 in Step S210.

Specifically, the CPU 32 releases the limitation on operation of the wiper 18 stopped in the limitation process and restarts the operation of the wiper 18. At this time, when it is not rainy, the wiper 18 may be stopped after the wiper 18 is caused to reciprocate about several times to wipe the windshield 16 with a configuration in which the wiper 18 operates automatically according to an amount of rainfall from a rainfall sensor.

The CPU 32 moves the vehicular seat 50 to a predetermined state in Step S210. Specifically, when the vehicular seat 50 faces the vehicle width direction or the rear side of the vehicle, the CPU 32 activates the motor such that the vehicular seat 50 is turned to the front side of the vehicle. When the vehicular seat 50 is in the reclined state in which the reclining angle thereof is greater than a threshold value, the CPU 32 activates the motor to move the vehicular seat 50 to the upright state. Then, the CPU 32 ends the limitation releasing process.

The onboard devices other than the wiper 18 are also controlled in the same way as described above. For example, when the onboard device is the electronic mirror 24, it is determined whether the operation of the electronic mirror 24 is being limited in Step S206 of the limitation releasing process illustrated in FIG. 5. In Step S210, the operation of the electronic mirror 24 is restarted. That is, an outside image is displayed on the display device 26.

As described above, in the display control device 10 according to this embodiment, the operation of at least one onboard device out of the onboard devices is limited at the time of automated driving of the vehicle 12. Accordingly, when an occupant is not interested in the outside information at the time of automated driving of the vehicle 12, it is possible to curb inconvenience due to the operation of the onboard device.

In this embodiment, the limitation releasing unit 64 releases the limitation on operation of the onboard device when it is determined that an occupant is interested in the outside information in a state in which the operation of the onboard device is limited by the onboard device limiting unit 60. Accordingly, an occupant can ascertain the outside information without performing any particular operation.

In this embodiment, since the vehicular seat 50 is directed to the sight direction by the seat direction control unit 66, it is possible to improve comfort at the time of ascertaining the outside information.

In this embodiment, an occupant can release the limitation on operation of the onboard device simply by turning the seat back of the vehicular seat 50 in the direction in which the seat back is brought upright to ascertain the outside information.

In this embodiment, the seat back of the vehicular seat 50 is turned in the direction in which the seat back is brought upright by decreasing the reclining angle of the vehicular seat 50 using the reclining angle adjusting unit 68. Accordingly, when the limitation on operation of the onboard device is released, an occupant can easily ascertain the outside information.

In this embodiment, since the operation of the wiper 18 is stopped by the onboard device limiting unit 60 at the time of automated driving, it is possible to curb an inconvenient feeling due to the wiper at the time of rainfall. On the other hand, when it is determined that an occupant is interested in the outside information, the wiper 18 can be operated by the limitation releasing unit 64 and thus the occupant can ascertain the outside information.

In this embodiment, since display of an outside information on the display device 26 is stopped by the onboard device limiting unit 60 at the time of automated driving, an occupant may not pay attention to the outside image. Another image can be displayed using the display device 26 that displays the outside image. On the other hand, when it is determined that an occupant is interested in the outside information, the outside image is displayed on the display device 26 and thus the occupant can ascertain the outside information.

As described above, with the display control device 10 according to this embodiment, it is possible to enhance visibility outside of the vehicle when an occupant is interested in the outside while curbing inconvenience at the time of automated driving.

Second Embodiment

An outside information display control device 70 according to a second embodiment (hereinafter simply referred to as a "display control device 70") will be described below with reference to the accompanying drawings. This embodiment is different from the first embodiment in that limitation on operation of an onboard device is released when a vehicle approaches a position in which an occupant is interested. The same elements as in the first embodiment will be referred to by the same reference signs and description thereof will be appropriately omitted. The hardware configuration of the display control device 70 is the same as the configuration of the first embodiment illustrated in FIG. 2 and illustration and description thereof will be omitted.

Functional Configuration of Display Control Device 70

The display control device 70 realizes various functions using hardware resources. The functional units which are realized by the display control device 70 will be described below with reference to FIG. 6.

Figure 6:
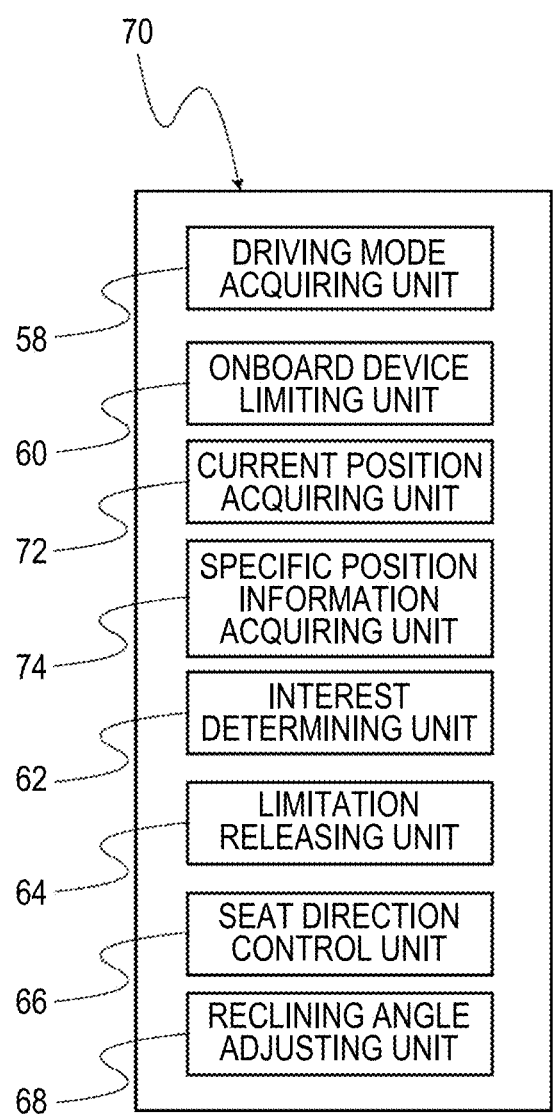
FIG. 6 is a block diagram illustrating a functional configuration of an outside information display control device according to a second embodiment.

As illustrated in FIG. 6, the display control device 70 includes a driving mode acquiring unit 58, an onboard device limiting unit 60, a current position acquiring unit 72, and a specific position information acquiring unit 74, an interest determining unit 62, a limitation releasing unit 64, a seat direction control unit 66, and a reclining angle adjusting unit 68 as the functional units. The functional units are realized by causing the CPU 32 to read and execute a program stored in the ROM 34 or the storage 38.

The current position acquiring unit 72 acquires a current position of the vehicle. Specifically, the current position acquiring unit 72 acquires position information on map data in which the vehicle is currently traveling based on information from the GPS sensor constituting the surrounding information sensor group 54.

The specific position information acquiring unit 74 acquires a place which satisfies conditions set by an occupant's operation from the map data. For example, an occupant registers information on a place of interest, that is, a specific position, in advance by operating a mobile terminal such as a smartphone. At this time, the specific position may be stored in an internal storage area of the mobile terminal such as a smartphone or may be stored in a server. The specific position mentioned herein may be a place of which two or more exist such as restaurants, gas stations, and convenience stores in addition to a specific sea, mountain, building, station, or the like.

The specific position information acquiring unit 74 acquires the specific position registered by the occupant from the mobile terminal or the server, calculates coordinates of the specific position on the map data, and acquires the coordinates as specific position information. For example, when the specific position is a restaurant, coordinates registered as restaurants near the current position of the vehicle on the map data are acquired as specific position information.

When the current position of the vehicle acquired by the current position acquiring unit 72 approaches the position acquired by the specific position information acquiring unit 74, the interest determining unit 62 determines that the occupant is interested in the outside information. In this embodiment, for example, when the specific position comes in a range which the occupant can see from the vehicle, it is determined that the occupant is interested in the outside information.

When the interest determining unit 62 determines that the occupant is interested in the outside information in a state in which the operation of an onboard device is limited by the onboard device limiting unit 60, the limitation releasing unit 64 releases the limitation on operation of the onboard device by the onboard device limiting unit 60. That is, in this embodiment, when the specific position comes in a range which the occupant can see from the vehicle, the limitation on operation of the onboard device by the onboard device limiting unit 60 is released.

Operations

Operations of this embodiment will be described below.

The routine of the limitation process of limiting an operation of an onboard device is the same as that in the first embodiment illustrated in FIG. 4 and thus description thereof will be omitted. An example of a routine of a limitation releasing process of releasing the limitation on operation of the onboard device will be described below with reference to the flowchart illustrated in FIG. 7. Here, a case in which the limitation on operation of the wiper 18 is released will be described. The limitation releasing process is repeatedly performed at predetermined intervals by causing the CPU 32 to read a display program from the ROM 34 or the storage 38, to load the read display program to the RAM 36, and to execute the loaded display program.

Limitation Releasing Process

Figure 7:
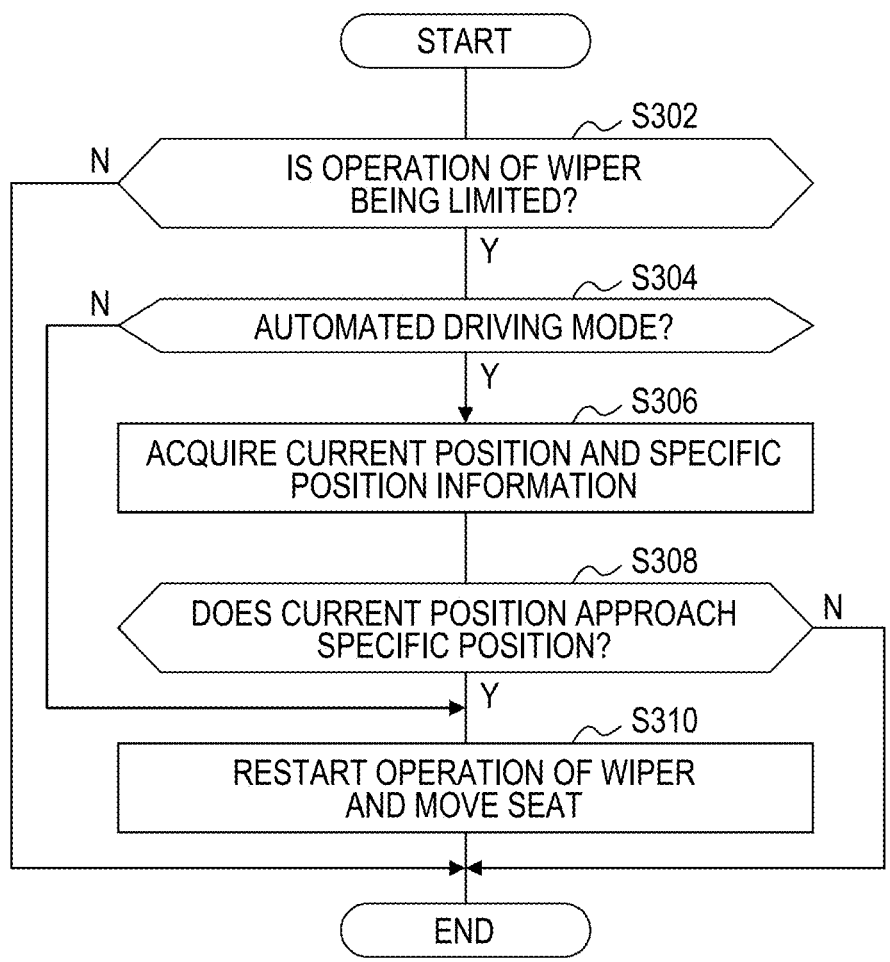
FIG. 7 is a flowchart illustrating an example of a routine of a limitation releasing process according to the second embodiment.

As illustrated in FIG. 7, the CPU 32 determines whether the operation of the wiper 18 is being limited in Step S302. Specifically, when the wiper 18 is stopped by the limitation process, the CPU 32 determines that the wiper 18 is being limited. In this case, the determination result of Step S302 is positive and the routine proceeds to the process of Step S304. On the other hand, in a state in which the limitation process is not performed, the CPU 32 determines that the wiper 18 is not being limited. In this case, the determination result of Step S302 is negative and the limitation releasing process ends.

The CPU 32 determines whether the driving mode of the vehicle is the automated driving mode in Step S304. When the driving mode acquired by the driving mode acquiring unit 58 is the automated driving mode, the CPU 32 determines that the driving mode is the automated driving mode. In this case, the determination result of Step S304 is positive and the routine proceeds to the process of Step S306. On the other hand, when the driving mode acquired by the driving mode acquiring unit 58 is the manual driving mode, the determination result of Step S304 is negative and the CPU 32 performs the process of Step S310.

The CPU 32 acquires a current position of the vehicle and specific position information in Step S306. Specifically, the CPU 32 acquires the current position of the vehicle based on a signal from the GPS sensor by the function of the current position acquiring unit 72. The CPU 32 acquires the specific position information in which the occupant is interested by the function of the specific position information acquiring unit 74.

Subsequently, the CPU 32 determines whether the current position of the vehicle approaches the specific position in Step S308. Specifically, the CPU 32 compares the current position of the vehicle with the specific position information by the function of the interest determining unit 62, and the determination result of Step S308 is positive and the routine proceeds to the process of Step S310 when the current position approaches the specific position such that the occupant can see the specific position from the vehicle. On the other hand, when the current position of the vehicle is distant from the specific position, the determination result of Step S308 is negative and the CPU 32 ends the limitation releasing process.

The CPU 32 restarts the operation of the wiper 18 in Step S310. Specifically, the CPU 32 releases the limitation on operation of the wiper 18 stopped in the limitation process and restarts the operation of the wiper 18. At this time, when it is not rainy, the wiper 18 may be stopped after the wiper 18 is caused to reciprocate about several times to wipe the windshield 16 with a configuration in which the wiper 18 operates automatically according to an amount of rainfall from a rainfall sensor.

In Step S310, the CPU 32 activates the motor such that the vehicular seat 50 is turned to the front side of the vehicle. When the vehicular seat 50 is in the reclined state in which the reclining angle thereof is greater than a threshold value, the CPU 32 activates the motor to move the vehicular seat 50 to the upright state. Then, the CPU 32 ends the limitation releasing process.

The onboard devices other than the wiper 18 are also controlled in the same way as described above. For example, when the onboard device is the electronic mirror 24, the operation of the electronic mirror 24 is restarted in Step S310. That is, an outside image is displayed on the display device 26.

In this way, with the display control device 70 according to this embodiment, simply by setting conditions in advance based on a favorite place and an interested place of an occupant and the like, it is possible to release the limitation on operation of an onboard device when a place satisfying the conditions is approached.

While the outside information display control devices 10 and 70 according to the first embodiment and the second embodiment have been described above, the disclosure can be modified in various forms without departing from the gist of the disclosure. For example, in the aforementioned embodiments, the interest determining unit 62 determines whether an occupant is interested in the outside information based on at least one of information of a sight direction of the occupant and information from the reclining angle sensor, but the disclosure is not limited thereto. That is, when an occupant operates a button or a switch for releasing the limitation on operation of the wiper 18 in a state in which the operation of the wiper 18 is limited, the interest determining unit 62 may determine that the occupant is interested in the outside information. In this case, simply by operating a button, a switch, or the like, the occupant can release the limitation on operation of the wiper 18.

When a distance from another vehicle is decreased at the time of automated driving, the interest determining unit 62 may determine that the occupant is interested in the outside information. In this case, for example, by releasing the limitation on operation of the wiper when a distance from a preceding vehicle is decreased, it is possible to allow the occupant to see that the host vehicle approaches the preceding vehicle.

In the aforementioned embodiments, a pair of right and left wiper arms 20 is moved with one wiper motor 42, but the disclosure is not limited thereto. For example, a configuration in which the right wiper arm 20 and the left wiper arm 20 are independently movable may be employed. In this case, when it is determined that only an occupant sitting on the driver's seat is interested in the outside information, the limitation on operation of only the wiper arm 20 on the driver's seat side may be released. Accordingly, only the right area of the windshield 16 is wiped and only the driver can ascertain the outside information.

In the aforementioned embodiments, the limitation on operation of an onboard device is released when a sight direction of an occupant is directed to the front side of the vehicle, but the disclosure is not limited thereto. For example, in a configuration in which a rear wiper for wiping a rear windshield of the vehicle is provided, when an occupant is interested in the rear information of the vehicle, the interest determining unit 62 may determine that the occupant is interested in the outside information by allowing the sight direction of the occupant to be directed to the rear side of the vehicle. In this case, the limitation on operation of the rear wiper is released by the limitation releasing unit 64.

In a configuration in which a defroster air outlet of a side defroster for removing fogging of a side window is provided, when an occupant is interested in side information of the vehicle, the interest determining unit 62 may determine that the occupant is interested in the outside information by allowing the sight direction of the occupant to be directed to the side of the vehicle. In this case, the limitation on operation of the side defroster is released by the limitation releasing unit 64.

In the second embodiment, an occupant registers a specific position in advance by operating a mobile terminal such as a smartphone, but the disclosure is not limited thereto. For example, an occupant may register a specific position in a navigation system through voice input or the like at the time of automated driving.

In the aforementioned embodiments, the processes which are performed by causing the CPU 32 to read software (a program) may be performed by various processors other than the CPU 32. In this case, examples of the processor include a programmable logic device (PLD) of which a circuit configuration can be changed after it has been manufactured such as a field-programmable gate array (FPGA) and a dedicated electric circuit which is a processor having a circuit configuration specially designed to perform a specific process such as an application specific integrated circuit (ASIC). The limitation process and the limitation releasing process may be performed by one of the various processors or may be performed in combination of two or more processors which are of the same type or different types (for example, a plurality of FPGAs or a combination of a CPU and an FPGA). A hardware structure of the various processors is more specifically an electric circuit in which circuit elements such as semiconductor elements are combined.

In the aforementioned embodiments, a non-transitory recording medium is used as the storage 38, but the disclosure is not limited thereto. For example, a non-transitory recording medium such as a compact disk (CD), a digital versatile disk (DVD), or a universal serial bus (USB) memory may be used as the recording medium. In this case, various programs may be stored in such a recording medium.

What is claimed is:

1. An outside information display control device, comprising:
    an onboard device limiting unit configured to limit operation of at least one of onboard devices including a wiper, an electronic mirror, and a defroster at a time of automated driving of a vehicle;
    an interest determining unit configured to determine whether an occupant is interested in outside information based on at least one of a sight direction of the occupant and a predetermined operation performed by the occupant;
    a limitation releasing unit configured to release limitation on the operation of the at least one of onboard devices by the onboard device limiting unit when the interest determining unit determines that the occupant is interested in the outside information in a state in which the operation of the at least one of onboard devices has been limited by the onboard device limiting unit; and
    a seat direction control unit configured to turn a direction of a vehicular seat to the sight direction of the occupant when the limitation on the operation of the at least one of onboard devices is released by the limitation releasing unit, wherein
    the interest determining unit is configured to determine that the occupant is interested in the outside information when a predetermined time has elapsed in a state in which the sight direction of the occupant is outward of the vehicle.

2. The outside information display control device according to claim 1, wherein
    the interest determining unit is configured to determine that the occupant is interested in the outside information when an operation of decreasing a reclining angle of the vehicular seat which is performed by the occupant is detected.

3. The outside information display control device according to claim 1, further comprising:
a reclining angle adjusting unit configured to decrease a reclining angle of the vehicular seat when the limitation on the operation of the at least one of onboard devices is released by the limitation releasing unit and the reclining angle is greater than a predetermined angle.

4. The outside information display control device according to claim 1,
wherein the onboard device limiting unit is configured to stop operation of the wiper at the time of automated driving of the vehicle, and
wherein the limitation releasing unit is configured to operate the wiper when the interest determining unit determines that the occupant is interested in the outside information in a state in which the operation of the wiper has been stopped by the onboard device limiting unit.

5. The outside information display control device according to claim 1, wherein
the onboard device limiting unit is configured to stop display of an outside image which is captured by the electronic mirror at the time of automated driving of the vehicle, and
wherein the limitation releasing unit is configured to display the outside image when the interest determining unit determines that the occupant is interested in the outside information in a state in which the display of the outside image has been stopped by the onboard device limiting unit.

6. The outside information display control device according to claim 1, further comprising:
a current position acquiring unit configured to acquire a current position of the vehicle on map data; and
a specific position information acquiring unit configured to acquire a position, at which set conditions are satisfied by the predetermined operation, from the map data,
wherein the interest determining unit is configured to determine that the occupant is interested in the outside information when the current position of the vehicle acquired by the current position acquiring unit approaches the position acquired by the specific position information acquiring unit.

7. An outside information display control method comprising:
limiting operation of at least one of onboard devices including a wiper, an electronic mirror, and a defroster at a time of automated driving of a vehicle;
determining whether an occupant is interested in outside information based on at least one of a sight direction of the occupant and a predetermined operation performed by the occupant; and
releasing the limitation on the operation of the at least one of onboard devices when it is determined that the occupant is interested in the outside information in a state in which the operation of the at least one of onboard devices has been limited, wherein
in the determining of whether the occupant is interested in the outside information, the occupant is determined to be interested in the outside information when a predetermined time has elapsed in a state in which the sight direction of the occupant is outward of the vehicle, and
a direction of a vehicular seat is turned to the sight direction of the occupant when the limitation on the operation of the at least one of onboard devices is released.

8. A program causing a computer to perform a process, the process comprising:
limiting operation of at least one of onboard devices including a wiper, an electronic mirror, and a defroster at a time of automated driving of a vehicle;
determining whether an occupant is interested in outside information based on at least one of a sight direction of the occupant and a predetermined operation performed by the occupant; and
releasing the limitation on the operation of the at least one of onboard devices when it is determined that the occupant is interested in the outside information in a state in which the operation of the at least one of onboard devices has been limited, wherein
in the determining of whether the occupant is interested in the outside information, the occupant is determined to be interested in the outside information when a predetermined time has elapsed in a state in which the sight direction of the occupant is outward of the vehicle, and
a direction of a vehicular seat is turned to the sight direction of the occupant when the limitation on the operation of the at least one of onboard devices is released.

* * * * *